United States Patent
Bamberg et al.

(10) Patent No.: US 10,456,867 B2
(45) Date of Patent: Oct. 29, 2019

(54) MICRO-FORGING BY A GENERATIVE MANUFACTURING PROCESS

(71) Applicant: MTU Aero Engines AG, Munich (DE)

(72) Inventors: Joachim Bamberg, Dachau (DE);
Roland Hessert, Herrsching (DE);
Georg Schlick, Munich (DE)

(73) Assignee: MTU Aero Engines AG, Munich (DE)

( * ) Notice: Subject to any disclaimer, the term of this patent is extended or adjusted under 35 U.S.C. 154(b) by 330 days.

(21) Appl. No.: 15/449,431

(22) Filed: Mar. 3, 2017

(65) Prior Publication Data
US 2017/0252860 A1    Sep. 7, 2017

(30) Foreign Application Priority Data
Mar. 7, 2016  (DE) .................. 10 2016 203 649

(51) Int. Cl.
*B23K 26/34*    (2014.01)
*B33Y 10/00*    (2015.01)
(Continued)

(52) U.S. Cl.
CPC .......... *B23K 26/356* (2015.10); *B22F 3/1055* (2013.01); *B23K 15/0086* (2013.01);
(Continued)

(58) Field of Classification Search
CPC ... B23K 15/0086; B23K 26/34–26/342; B33Y 10/00; B22F 3/10–3/1003; B22F 3/1017; B22F 3/12
See application file for complete search history.

(56) References Cited

U.S. PATENT DOCUMENTS 5,207,371 A * 5/1993 Prinz .................. B22F 3/008
                                                164/46
5,387,380 A * 2/1995 Cima .................. B05C 19/04
                                                264/109

(Continued)

FOREIGN PATENT DOCUMENTS

DE         69805946 T2    1/2003
DE     102009051551 A1    5/2011
(Continued)

OTHER PUBLICATIONS

Frungel, Frank B. A., "High Speed Pulse Technology", vol. II, Optical Pulses—Lasers—Measuring Techniques, Academic Press, p. 192 ISBN 9781483274371, 1965, 2014.
(Continued)

*Primary Examiner* — Michael A LaFlame, Jr.
(74) *Attorney, Agent, or Firm* — Barlow, Josephs & Holmes, Ltd.

(57) ABSTRACT

The present invention relates to a device as well as a method for the additive manufacture of components by deposition of material layers by layer-by-layer joining of powder particles to one another and/or to an already produced pre-product or substrate, via selective interaction of the powder particles with a high-energy beam, wherein, for smoothing a surface of the component being produced running crosswise to the deposited material layers in between the deposition of two layers of the component, the complete edge region of the last layer that is applied and that runs along a surface of the component being produced is compacted in a direction of action that has a directional component parallel to the build-up direction of the layers, and/or at least one edge region of a surface of the component is also compacted.

13 Claims, 3 Drawing Sheets

(51) Int. Cl.

| | |
|---|---|
| *B23K 26/356* | (2014.01) |
| *B33Y 30/00* | (2015.01) |
| *B33Y 40/00* | (2015.01) |
| *B23K 26/342* | (2014.01) |
| *B23K 15/00* | (2006.01) |
| *C21D 10/00* | (2006.01) |
| *B22F 3/105* | (2006.01) |
| *B29C 64/153* | (2017.01) |
| *B29C 64/188* | (2017.01) |
| *B23K 20/10* | (2006.01) |
| *B23K 26/352* | (2014.01) |

(52) U.S. Cl.
CPC .......... *B23K 15/0093* (2013.01); *B23K 20/10* (2013.01); *B23K 26/342* (2015.10); *B23K 26/352* (2015.10); *B23K 26/3576* (2018.08); *B29C 64/153* (2017.08); *B29C 64/188* (2017.08); *B33Y 10/00* (2014.12); *B33Y 30/00* (2014.12); *B33Y 40/00* (2014.12); *C21D 10/005* (2013.01); *B22F 2003/1056* (2013.01); *B22F 2998/10* (2013.01); *Y02P 10/295* (2015.11)

(56) References Cited

U.S. PATENT DOCUMENTS

| | | | |
|---|---|---|---|
| 2011/0106290 A1* | 5/2011 | Hovel | B22F 3/1055 700/120 |
| 2012/0217226 A1 | 8/2012 | Bayer et al. | |
| 2013/0196118 A1 | 8/2013 | Bamberg et al. | |
| 2014/0255198 A1 | 9/2014 | El-Wardany et al. | |
| 2014/0348692 A1 | 11/2014 | Bessac et al. | |
| 2015/0041025 A1 | 2/2015 | Wescott et al. | |
| 2015/0266285 A1* | 9/2015 | James | B33Y 40/00 419/28 |
| 2015/0314373 A1 | 11/2015 | Mironets et al. | |
| 2016/0228975 A1* | 8/2016 | Blackmore | B33Y 10/00 |
| 2016/0332371 A1* | 11/2016 | Staroselsky | B22F 5/04 |
| 2018/0154484 A1* | 6/2018 | Hall | B22F 3/1055 |

FOREIGN PATENT DOCUMENTS

| | | |
|---|---|---|
| DE | 102010050531 A1 | 3/2012 |
| DE | 102015212529 A1 | 1/2017 |
| GB | 2500996 A | 10/2013 |
| WO | 2012152259 A1 | 11/2012 |

OTHER PUBLICATIONS

Taylor, Nick, "LASER—The Inventor, The Nobel Laureate, and the Thirty-Year Patent War," Simon & Schuster, p. 93, ISBN 0-684-83515-0, 2000.

McClung, F. J. and Hellwarth, R. W., "Giant Optical Pulsations from Ruby," Journal of Applied Physics, vol. 33, No. 3, pp. 828-829, 1962.

"Influence of High-Frequency Micro-Forging on Microstructure and Properties of 304 Stainless Steel Fabricated by Laser Rapid Prototyping", Zhang, Yan et al.; Steel Research International, 84 (2013) No. 9, pp. 870-877, Germany.

"Influence of High-Frequency Micro-Forging on Microstructure and Properties of 304 Stainless Steel Fabricated by Laser Rapid Prototyping", Zhang, Yan et al.; Steel Research International, 84 (2013) No. 9, pp. 870-877, Jan. 6, 2014 update, Germany.

* cited by examiner

MICRO-FORGING BY A GENERATIVE MANUFACTURING PROCESS

BACKGROUND OF THE INVENTION

Field of the Invention

The present invention relates to a method and a device for the generative or additive manufacture of components by layer-by-layer joining of powder particles to one another and/or to an already produced semi-finished product or pre-product or substrate, via selective interaction of the powder particles with a high-energy beam, in particular a method and a device for selective laser-beam or electron-beam melting.

Prior Art

Additive manufacturing methods for the manufacture of a component, such as, for example, selective laser melting, selective electron-beam melting, or laser deposition welding, in which the component is built up layer-by-layer with the use of powder material, are employed in industry for so-called rapid tooling, rapid prototyping, or also for the production of mass-produced products within the scope of rapid manufacturing. In particular, such methods can also be used for the manufacture of turbine parts, particularly parts for aircraft engines, in which, for example, additive manufacturing methods of this type are advantageous due to the material used. An example of this is found in DE 10 2010 050 531 A1.

For improving such a method, it is known, for example, from WO 2012/152259 A1 to rework the applied layers or material layers after the melting and re-solidifying of the powder so as to influence the microstructure of the deposited material. This can be carried out, for example, by an ultrasonic impact treatment (UIT) or by a laser shock peening (LSP).

In the case of additive manufacture with a layer-by-layer application of material, surface roughness and the formation of defect sites in the form of pores and microcracks may occur at the edges of the deposited material layers, which may be an inner-lying surface (cavities) or an outer-lying (outside) surface of the component being produced.

In order to avoid these defect sites, it is known to post-weld the edge regions of the deposited material layers, i.e., to once more re-melt them in order to obtain an edge region that is as smooth as possible. Moreover, the surface of the component being produced can be smoothed by grinding or polishing in order to avoid the circumstance that there will be negative effects on strength, in particular resistance to vibration due to the surface roughness and defect sites in the surface.

Of course, in addition, there results the problem that the surfaces of the additively or generatively manufactured component are frequently not accessible or no longer accessible or difficultly accessible to the post-processing tools, in particular when they involve inner-lying surfaces of cavities. Additionally, a post-processing of the surfaces by grinding and polishing is often complex and costly, in particular when there needs to be a large amount of material removed in order to eliminate defect sites such as pores or microcracks in the surface or in regions near the surface.

SUMMARY OF THE INVENTION

Object of the Invention

It is thus the object of the present invention to provide a method and a device for the additive manufacture of components by layer-by-layer joining of powder particles to one another and/or to an already produced pre-product or substrate, via selective interaction of powder particles with a high-energy beam, in which the above-described problems are avoided or at least reduced. Nevertheless, the method shall be simple to conduct and the device shall be simply constructed and easy to operate, so that the corresponding additive manufacture can be employed in industrial processes.

Technical Solution

This object is achieved by a method with the features of claim 1 and a device with the features of claim 13. Advantageous embodiments are the subject of the dependent claims.

In order to achieve the above-described object, the present invention proposes to compact the edge region of a surface of the component by laser shock peening (LSP) or by ultrasonic impact treatment (UIT) already during the method for the additive manufacture of components. Defect sites such as microcracks or pores in the edge regions can be eliminated by this compacting. In addition, during the additive manufacture, all surface regions of the component are still accessible, so that a corresponding processing can take place. Compacting during the additive manufacturing method, thus compacting in between two deposition processes of respective material layers, moreover, has the advantage that by depositing another material layer following the compacting of the edge region, a heat treatment takes place involving the already deposited material layers and correspondingly compacted edge regions, so that a fine-grained structure is produced in the edge regions.

Compacting can be carried out by compacting in a direction of action having a directional component which is parallel to the build-up direction of the material layers and/or parallel to the normal line relative to the surface. In this document, the direction of action of compacting means the direction in which the laser pulses in a laser shock peening or a tool moved back and forth with ultrasonic frequency in ultrasonic impact treatment act or acts on the material being compacted. In the case of a laser pulse or an ultrasonic tool acting obliquely on the surface of the component or on the plane of a material layer, the direction of action can be divided in the sense of a vector addition into corresponding components that are perpendicular to one another, these components being parallel and perpendicular to the respective surface or plane. The build-up direction of the component or of the material layers in this case is the direction in which successive material layers are deposited, thus the direction perpendicular to the plane of the material layer.

Advantageously, the compacting of the front side of the material layers or the side of the surface of the component running crosswise to the material layers can be carried out so that the laser beam or a processing tool will act directly on the surface of the component, and a direction of action of the compacting has a directional component that is parallel to the normal line of the surface, since in this way, not only are a compacting of the edge region and a suitable structure of the edge region established, and defect sites such as microcracks and pores can be eliminated or avoided in the edge region, but also the different layers can be better smoothed and meshed with one another at their front sides.

The laser shock peening or ultrasonic impact treatment for compacting an edge region near the surface in between the deposition of two layers of the component can take place exclusively in the edge region of a surface of the component, and in particular, along the entire edge region of a deposited material layer or along the entire periphery of all surfaces of the component being produced. In this case, edge region is understood as a region that is defined as the deposited material layer or the surface of the component being produced over a distance from the edge that is, in particular, less than or equal to five times, preferably less than or equal to two times the width of the tool that is used, i.e., the diameter of the pulsed laser beam or an ultrasonic tool of an ultrasonic impact device. The edge region can also be defined by the depth of impact of the tool used.

The compacting of the one or more edge regions near the surface of the component can be conducted after the deposition of each layer, or after every second, third or fourth layer, or after the deposition of a multiple number of layers.

The deposition of another material layer can be carried out after each laser shock peening or ultrasonic impact treatment in order to bring about a corresponding heat treatment of the compacted region by the deposition of another material layer. Moreover, the component can be subjected to an additional heat treatment after it is finished in order to produce a desired structure, such as, e.g., a forged structure, in particular taking into consideration the material compacting that has been carried out.

The compacting of the edge region of a surface with a directional component parallel to the normal line of the surface can be produced, in particular, by an ultrasonic impact treatment, in which a tool acting on the surface of the component is moved back and forth linearly at a frequency in the ultrasonic range, wherein a directional component of the linear movement runs parallel to the surface normal line.

The tool that is used for the ultrasonic impact treatment and that acts on the surface of the component can be formed from a material that is identical or at least similar to the material from which the component is built up. In this case, it is understood by the term "similar" that the materials belong to the same material class or correspond to the same type of alloy, or quantitatively and/or qualitatively agree by more than 50%, preferably by more than 75%, and, particularly by more than 90% in their chemical composition. For qualitative agreement, it is understood here that more than 50%, preferably more than 75%, particularly more than 90% of the alloy components correspond, while with quantitative similarity or agreement, the corresponding agreement of the volume or weight fraction of the corresponding material components is understood.

Correspondingly, a device for the additive manufacture of components can have at least one ultrasonic impact device for conducting an ultrasonic impact treatment, which has an ultrasonic tool for acting on the component being produced and which is designed so that the tool can travel in the processing region, so that any components formed in the processing region of the device can be processed on their surface.

If a powder bed is provided for the additive manufacture, the ultrasonic impact device or the corresponding tool can be designed so that the tool can be arranged and driven in the powder bed.

BRIEF DESCRIPTION OF THE FIGURES

The appended drawings show in a purely schematic way in.

DESCRIPTION OF THE INVENTION

Further advantages, characteristics and features of the present invention will be made clear in the following detailed description of examples of embodiment, the invention not being limited to these embodiment examples.

Figure 1:
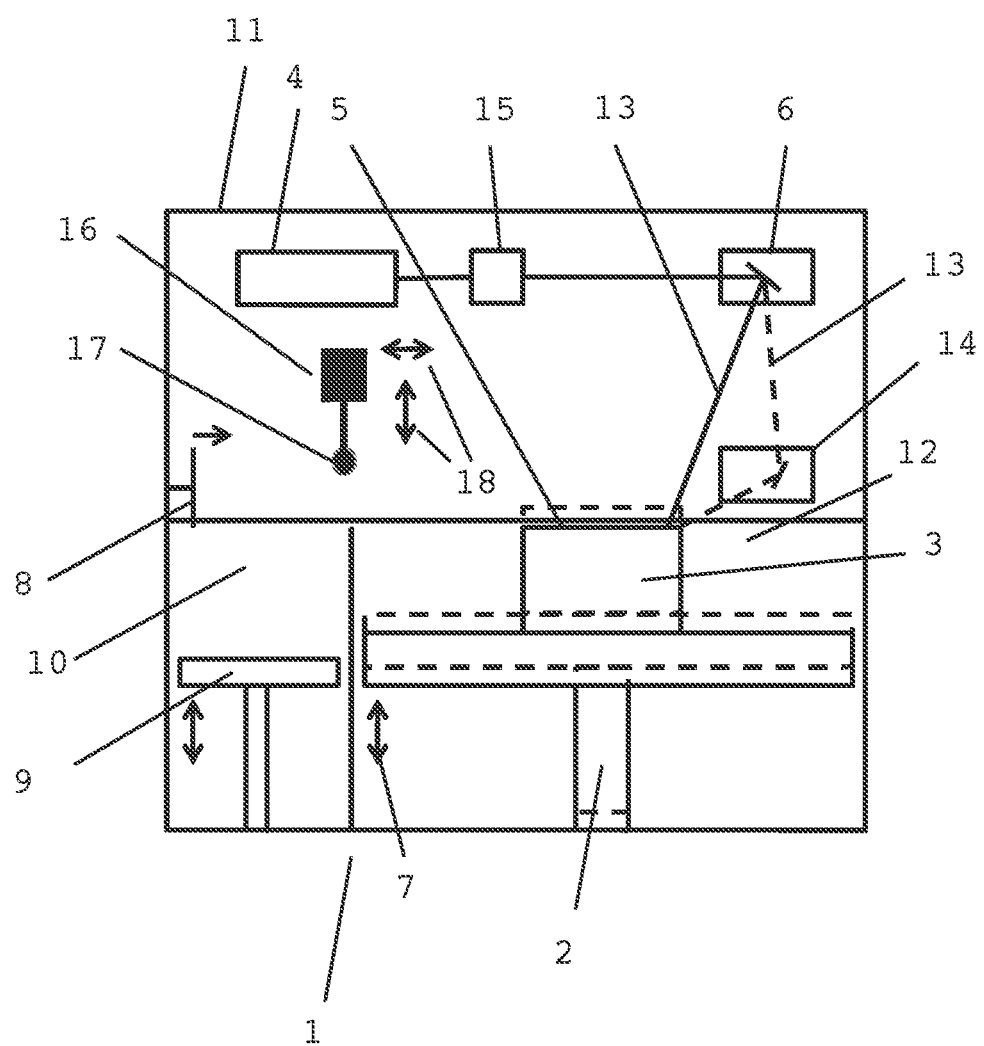
FIG. 1—a schematic representation of a device for the additive manufacture of components on the example of selective laser melting.

In a purely schematic representation, FIG. 1 shows a device 1, as can find use, for example, for selective laser melting in the additive manufacture of a component. The device 1 comprises, in a housing 11, a lift table 2 on the platform of which is disposed a semi-finished product or pre-product 3, onto which material is deposited layer by layer in order to produce a three-dimensional component. For this purpose, powder that is found in a powder supply container 10 above a lift table 9, is moved by a slider 8, layer by layer, over the pre-product 3 and subsequently joined to the already present pre-product 3 by melting via the laser beam 13 of a laser 4. After completely applying a powder layer 5, the lift table 2 is lowered corresponding to the movement possibility indicated by the arrow 7, in order to be able to apply a new powder layer 5 with the slider 8.

The powder material of the powder layer 5 is joined to the pre-product 3 via the laser 4, depending on the desired contour of the component to be fabricated, so that any desired three-dimensional form can be produced. Correspondingly, the laser beam 13 is guided over the powder bed 12, in order to melt powder material via different impact points on the powder bed corresponding to the contour of the three-dimensional component in the sectional plane of the component being produced, which corresponds to the powder layer plane, and to join to the already produced part of a component or to an initially provided substrate. In this way, the laser beam 13 can be guided over the surface of the powder bed 12 by a suitable deflection unit 6 and/or the powder bed could be moved opposite the laser beam 13.

A so-called Q-switch 15, which makes possible the generation of high-power laser pulses corresponding to so-called Q-switching, is provided between the laser 4 and the deflection unit 6. So-called Q-switching for the generation of high-power laser pulses is known in the prior art and is described, for example, in Frank B. A. Frungel, Optical Pulses—Lasers—Measuring Techniques, Academic Press, page 192, ISBN 9781483274317, 2014, and originally by Gordon Gould and R. B. Hellwarth and F. J. McClung (see Nick Taylor, Laser: The inventor, the Nobel Laureate and the Thirty-Year Patent War, New York, Simon & Schuster, ISBN 0-684-83515-0, page 93, and McClung, F J, Hellwarth, R. B., Giant Optical Pulsation from Ruby, Journal of Applied Physics, 33(3), pages 828-829, 1962).

While in normal selective laser melting, the Q-switch 15 is turned off and the laser beam 13 leads to the melting of the powder, a laser shock peening in which the corresponding material is microforged, can be brought about by turning on the Q-switch 15.

In order to be able to carry out the laser shock peening on a lateral surface of the already produced component 3, a second deflection unit 14 can be provided, with which the laser beam 13' in the form of laser pulses can be deflected onto the lateral surface of the component 3, which can be raised from the powder bed 12 for the laser shock peening, as is shown by the dashes.

Moreover, the device 1 has an ultrasonic impact device 16, in which a tool 17 can execute back-and-forth movements at a frequency in the ultrasonic range, whereby the tool can be brought into contact with the component, so that the tool 17 can act on the surface of the component 3. In order to be able to apply the tool 17 on any region of the component 3, the ultrasonic impact device 16 is arranged correspondingly mobile, so as to be able to carry out translatory movements, for example, corresponding to arrow 18. Moreover, the ultrasonic impact device 16 can also be rotated around at least one or a plurality of axes of rotation in order to make possible an appropriate alignment and orientation of the tool 17.

Both an ultrasonic impact treatment as well as a laser shock peening can be carried out with the device shown schematically in FIG. 1. Of course, a corresponding device can be designed only for a laser shock peening or only for an ultrasonic impact treatment.

Figure 2:
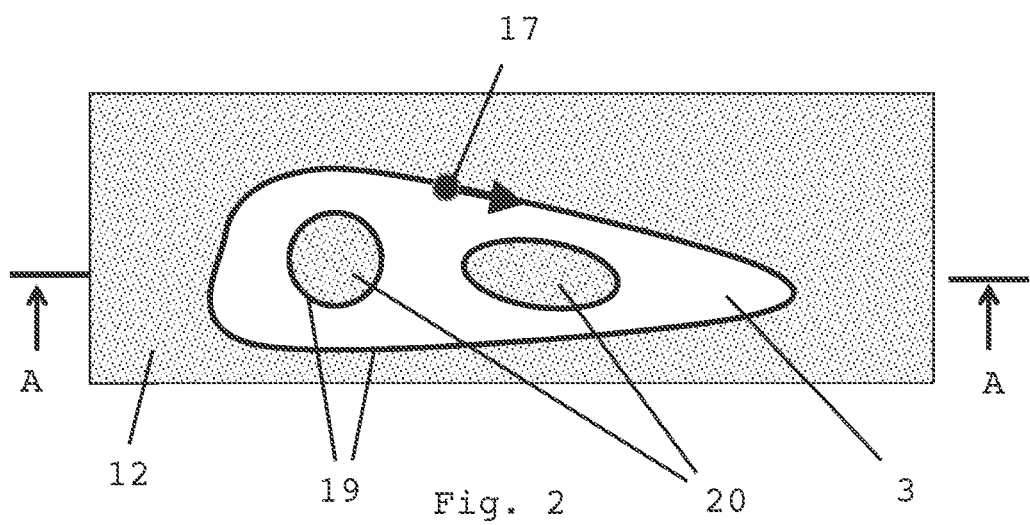
FIG. 2—a top view onto the component being produced during an ultrasonic impact treatment.

FIG. 2 shows in a top view an already produced component 3, as it can be produced, for example, in the device 1 of FIG. 1. It can be recognized in FIG. 2 that the component 3 has two cavities 20, in which the powder bed 12 is also present correspondingly.

It is shown in FIG. 2 how an edge region 19 of a surface of component 3 can be compacted by ultrasonic impact treatment, in order to produce a fine-grained structure in a subsequent deposition of another material layer onto the component 3 and by the heat correspondingly introduced thereby with melting of the powder, as well as in order to avoid defect sites such as pores and microcracks.

Figure 3:
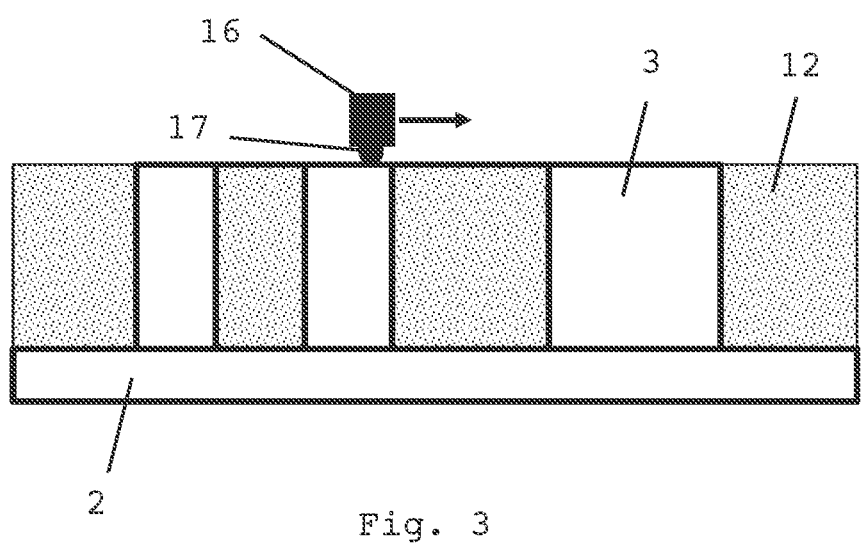
FIG. 3—a sectional view through the component arranged on the lift table and already produced during the ultrasonic impact treatment according to FIG. 2.

FIG. 2 as well as the sectional view of FIG. 3 illustrated in the section along the cutting line A-A of FIG. 2 show that the edge regions 19 can be solidified in the form of the peripheral line of component 3 or of cavities 20, that the ultrasonic impact device 16 or tool 17 thereof is moved along the peripheral line of component 3 or of cavities 20 and is simultaneously oscillated at a frequency in the ultrasonic range and acts on the component 3 or the last deposited layer from the top. The edge region 19 of the component 3 is compacted thereby, and when another layer is deposited in the next method step, a fine-grained structure is formed in edge region 19 due to the corresponding heating as a result of the melting of the powder layer.

Figure 4:
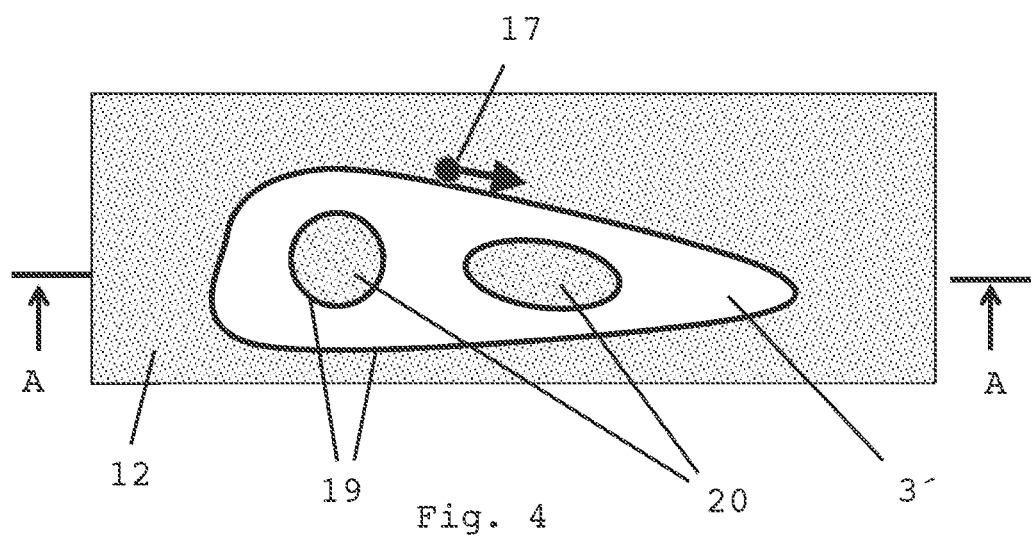
FIG. 4—a top view onto the component 3 already produced during a second kind of ultrasonic impact treatment; and in FIG. 5—a sectional view through a modified component during the ultrasonic impact treatment according to FIG. 4.
Figure 5:
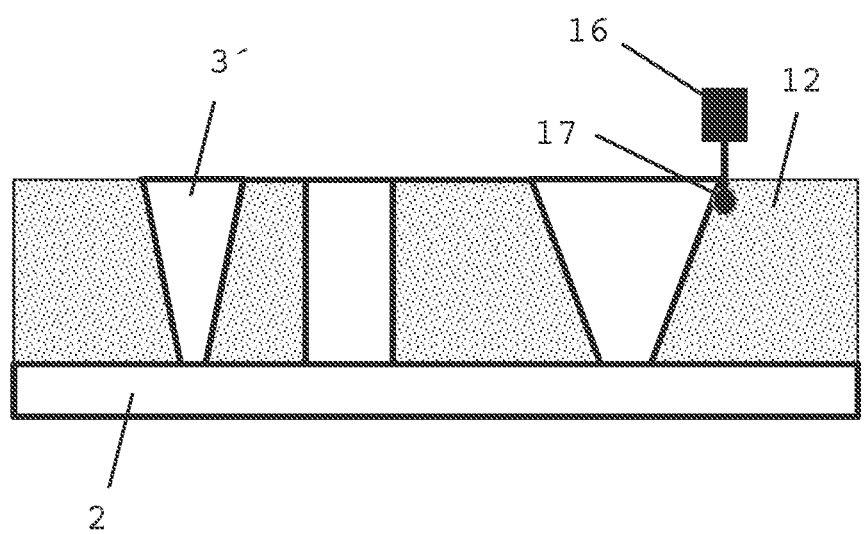

An alternative variant for compacting the edge region on a surface of a component being additively manufactured is shown in FIGS. 4 and 5. FIGS. 4 and 5 basically correspond to the illustration of FIGS. 2 and 3, but wherein a slightly modified component 3' can be seen, which, as is clear from the illustration of FIG. 5, has downward sloping lateral walls in the region of the outer surface of component 3' and of the delimitation of the cavities 20. In the case of the embodiment shown in FIGS. 4 and 5, the compacting of the edge layer is conducted by an ultrasonic impact treatment directly by action of the tool 17 on the surface of the component 3'. Correspondingly, the tool 17 is no longer arranged as in FIGS. 2 and 3 so that it acts on the last deposited material layer of the already produced component 3, but is arranged laterally to component 3' and acts on the surface of the component 3' or the lateral faces of the deposited layers of the component 3'.

In the exemplary embodiment shown in FIG. 5, the tool 17 in the form of a ball head is arranged in the powder bed 12 and executes therein an oscillating back-and-forth movement at a frequency in the ultrasonic range, whereby, with each stroke of the tool 17 upward, the ball comes in contact with the surface of the already produced component 3' in order to thus carry out an ultrasonic impact treatment.

Of course, it is also conceivable that the ultrasonic impact device 16 with the tool 17 is arranged so that, due to the linear back-and-forth movement, an impact action takes place on the surface of the component 3' parallel to the normal line of the surface; thus, as an example, the ultrasonic impact device 16 with the tool 17 of FIG. 5 is rotated to the right.

Instead of the ultrasonic impact treatment illustrated in FIGS. 2 to 5, it is of course also possible to carry out a laser shock peening. Instead of tool 17 that acts on the component 3 or 3', a corresponding laser beam in the form of laser pulses then acts on the component 3 or 3' corresponding to the device of FIG. 1.

Although the present invention has been described in detail on the basis of the exemplary embodiments, it is obvious to the person skilled in the art that the invention is not limited to these exemplary embodiments, but rather that modifications are possible in such a way that individual features are omitted or other types of combinations of features can be realized, as long as they do not leave the scope of protection of the appended claims. The present disclosure includes all combinations of the proposed individual features.

The terms used in the present description, such as "up (top)", "down (bottom)", "right", "left", "lateral", etc. are to be understood with respect to the provided figures and refer to these.

What is claimed is:

1. A method for the additive manufacture of components by depositing material layers by layer-by-layer joining of powder particles to one another and/or to an already produced pre-product or substrate, via selective interaction of the powder particles with a high-energy beam, comprising the steps of:
    for smoothing a surface of the component being produced running crosswise to the deposited material layers in between the deposition of two layers of the component, the complete edge region of the last layer introduced, which runs along a surface of the component being produced, is compacted by laser shock peening or ultrasonic impact treatment in a direction of action that has a directional component parallel to the build-up direction of the layers, and/or at least one edge region of a surface of the component is compacted by laser shock peening or ultrasonic impact treatment in a direction of action that has a directional component parallel to the normal line of the surface,
    wherein the laser shock peening or the ultrasonic impact treatment in between the deposition of two layers of the component takes place exclusively in the edge region of a surface of the component.

2. The method according to claim 1, wherein
    the compacting is conducted from the side of the surface of the component in a direction of action with a directional component parallel to the normal line of the surface.

3. The method according to claim 1, wherein
    a layer is deposited after each laser shock peening or ultrasonic impact treatment.

4. The method according to claim 1, wherein
    after the deposition of each layer or every second, third or fourth layer, or after the deposition of a multiple number of layers, a laser shock peening or an ultrasonic impact treatment of the one or more edge regions of a surface of the component takes place.

5. The method according to claim 1, wherein after applying one layer and prior to compacting the edge region of a surface, post-welding the edge region of the applied layer.

6. The method according to claim 1, wherein the high-energy beam is a laser beam or an electron beam.

7. The method according to claim 1, wherein the powder in a powder bed is applied onto the already produced pre-product or substrate.

8. The method according to claim 7, wherein during the compacting, the component already produced, except for a region on which the next layer shall be applied, is arranged in the powder bed, or is raised out from the powder bed around the layers to be compacted in the edge region.

9. The method according to claim 1, wherein in the case of the ultrasonic impact treatment, a tool acting on the surface of the component is moved linearly back and forth, so that a directional component of the linear movement runs parallel to the surface normal line.

10. The method according to claim 1, wherein in the case of the ultrasonic impact treatment, a tool that acts on the surface of the component and that is formed from one of a material which is identical to the material from which the component is built up, a material that belongs to the same class of materials from which the component is built up, a material that corresponds to the same type of alloy as the materials from which the component is built up, or a material that agrees quantitatively and/or qualitatively by more than 50% in their chemical composition as the materials from which the component is built up.

11. The method according claim 1, wherein the produced component is subjected to a heat treatment.

12. A device for the additive manufacture of components by layer-by-layer joining of powder particles to one another and/or to an already produced pre-product or substrate, via selective interaction of the powder particles with a high-energy beam, particularly according to a method according to one of the preceding claims, with an irradiation device for providing a high-energy beam and a processing region, in which a powder layer can be arranged, wherein the high-energy beam and the processing region can be moved relative to one another, so that the high-energy beam can interact selectively with the powder in the processing region, comprising:
at least one ultrasonic impact device for conducting an ultrasonic impact treatment, which has a tool for acting on a component being produced, and is configured and arranged so that the tool can move in the processing region, so that any desired component shape can be processed on its surface in the processing region,
wherein a controller is configured and arranged to control a laser shock peening or the ultrasonic impact treatment in between the deposition of two layers of the component exclusively in an edge region of a surface of the component.

13. The device according to claim 12, wherein a powder bed is provided in the processing region, wherein the tool is configured and arranged and can be driven in the powder bed.

* * * * *